United States Patent [19]

Winkler et al.

[11] Patent Number: 5,096,348
[45] Date of Patent: Mar. 17, 1992

[54] MACHINE TOOL

[75] Inventors: Hans-Henning Winkler, Tuttlingen; Eugen Rutschle, Mühlheim, both of Fed. Rep. of Germany

[73] Assignee: Chiron-Werke GmbH & Co. KG, Tuttlingen, Fed. Rep. of Germany

[21] Appl. No.: 561,167

[22] Filed: Aug. 1, 1990

[30] Foreign Application Priority Data

Aug. 3, 1989 [DE] Fed. Rep. of Germany ....... 3925642

[51] Int. Cl.5 ................................ B23Q 1/26
[52] U.S. Cl. ........................ 409/235; 82/149; 384/39; 408/234
[58] Field of Search ............... 409/900.2, 235, 286, 409/287, 337, 904; 408/8, 234, 4; 82/149; 384/39, 40, 42, 43, 45, 57

[56] References Cited

U.S. PATENT DOCUMENTS

| 2,333,250 | 11/1948 | Hegg | 82/149 |
|---|---|---|---|
| 2,976,086 | 3/1961 | Trimble | 384/39 |
| 3,713,746 | 1/1973 | Luthy | 428/8 |
| 4,504,096 | 3/1985 | Roch | 408/234 |
| 4,577,913 | 3/1986 | Metelski | 389/57 X |
| 4,730,945 | 3/1988 | Luther et al. | 384/45 |
| 4,738,299 | 4/1988 | Hunter | 384/40 X |

FOREIGN PATENT DOCUMENTS

| 0059013 | 2/1982 | European Pat. Off. | |
| 128871 | 12/1984 | European Pat. Off. | 384/39 |
| 6609861 | 12/1964 | Fed. Rep. of Germany | |
| 1777002 | 8/1968 | Fed. Rep. of Germany | |
| 7024499 | 6/1970 | Fed. Rep. of Germany | |
| 3531813 | 9/1985 | Fed. Rep. of Germany | |
| 8903980 | 4/1989 | Fed. Rep. of Germany | |
| 1123265 | 10/1966 | United Kingdom | |

OTHER PUBLICATIONS

Leaflet "GT" by Gleitbelagtechnik GmbH SKC 3, 1982, various pages (17 pages total).

Primary Examiner—William Briggs
Attorney, Agent, or Firm—Pretty, Schroeder, Brueggemann & Clark

[57] ABSTRACT

A machine tool is equipped with a machine bed (10) and a carriage (23) of a headstock which is guided linearly on the said bed. To this end, the machine bed is provided with a guide rail (11), while the carriage (23) is equipped with a shoe (20) running on the guide rail (11) in form-locking engagement. The shoe (20) and the guide rail (11) engage each other by flat sliding surfaces (51 to 56) formed by the surfaces (51, 53, 55) of plastic sliding pads (46, 48, 50) and by metallic surfaces (52, 54, 56). The guide rail (11) has a narrower lower portion (15) and a wider upper portion (16) comprising a projection (17) extending laterally beyond the lower portion (15). The shoe (20) is split along a horizontal plane (40) and has its upper part (30) guided by the upper face of the projection (17) and its lower part guided by the lower face of the projection (17) (FIG. 3).

10 Claims, 4 Drawing Sheets

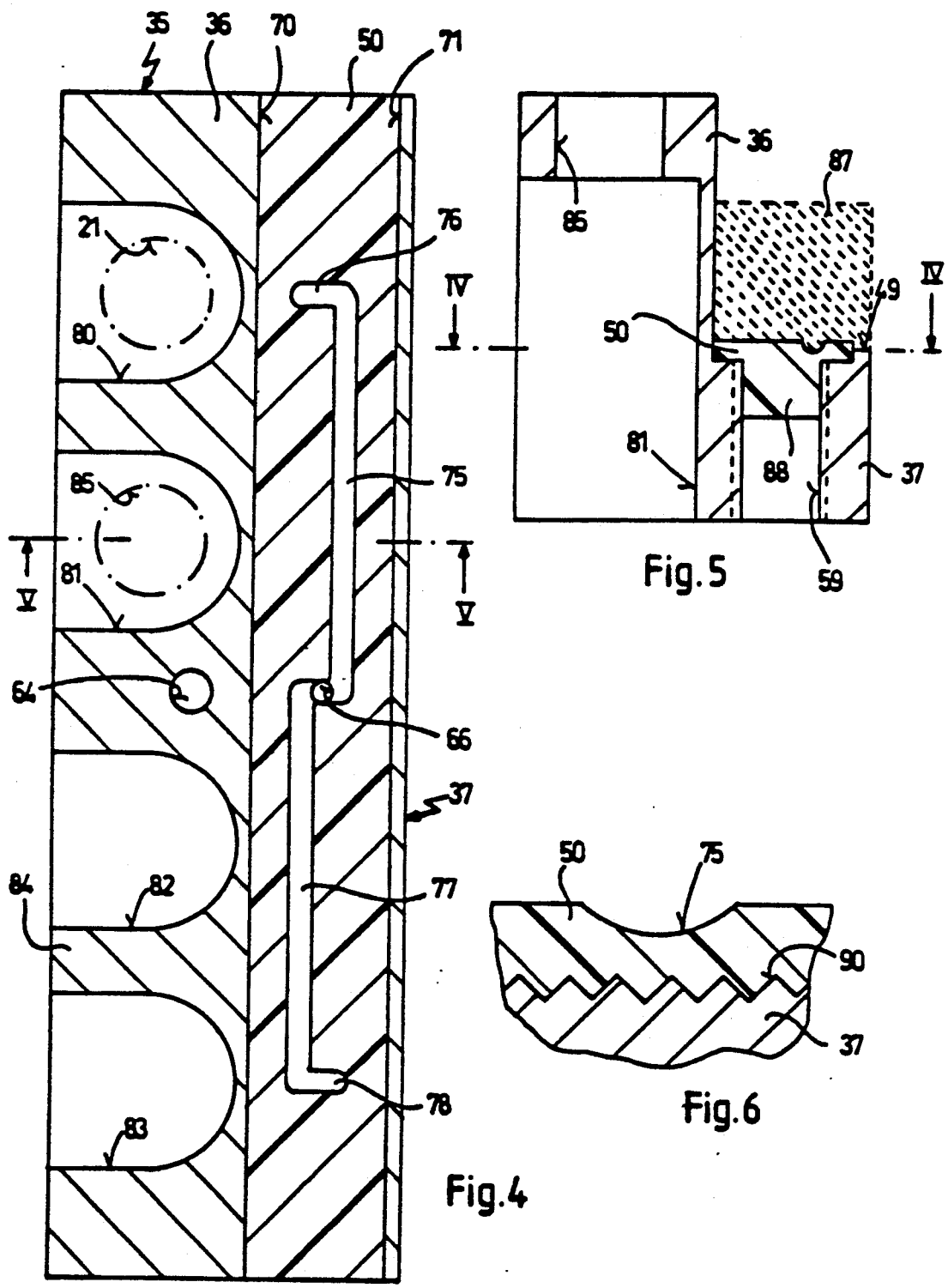

MACHINE TOOL

The present invention relates to a machine tool comprising a first machine element, for example a machine bed, and a second machine element, for example a carriage of a headstock, the machine elements being guided linearly along each other in such a way that the first machine element is provided with a linear guide rail, while the second machine element is equipped with a shoe running on the guide rail in form-locking engagement, the shoe and the guide rail engaging each other by flat sliding surfaces formed by the surfaces of plastic sliding pads on the one machine part and metallic surfaces on the other machine part, and the guide rail having further a narrow lower portion and a wider upper portion comprising a projection extending laterally beyond the lower portion, and the shoe being mounted on the second machine element by detachable mounting means.

A machine tool of the described type has been known from DE-U-89 03 980.

The known machine tool comprises a linear guide unit supported on roller bearings. A rail of substantially x-shaped cross-section is fixed on the machine frame by means of screws. The rail serves as guide for a carriage which in its turn is screwed, in detachable relationship, to a worktable provided on top of the arrangement. In order to enable the carriage to be guided on the rail, the carriage is provided with a matching x-shaped recess which is provided with a plastic lining over its full inner surface.

While this arrangement guarantees that the carriage is guided on the machine frame so as to prevent it from tilting about the longitudinal axis of the rail, the form-locking engagement between the rail and the carriage being non-rotationally symmetrical, it is an absolute requirement in the case of this machine tool that the carriage be mounted on the rail via the latter's ends, as the carriage is designed as a single piece so that the only way to remove the carriage from the rail is to pull it off in linear direction over the end faces.

DE-A-35 31 813 describes a machine tool comprising a guide system for the carriage where the carriage is guided on a guide rail of trapezoidal cross-section, the latter being mounted on the narrow upper face of the wall-like bracket. The arrangement is such that the guide rail projects laterally beyond the bracket. Consequently, the bottom face of the carriage is equipped with a matching trapezoidal recess, and the upper face as well as the inclined lateral face of the recess are lined with plastic sliding pads. Another vertical lateral surface is in contact with the carriage via roller bearings.

In order to prevent the carriage from tilting about the longitudinal axis of the guide rail, the lower face of the carriage is provided with a pressing device engaging below the projecting lower face of the guide rail. The upper face of the pressing device is also equipped with a roller bearing. The resulting overall arrangement is such that the carriage, together with the pressing device, are guided on the guide rail via roller bearings at the right vertical side and at the horizontal lower face, and via a plastic sliding pad at the horizontal upper face and another inclined side.

While this known machine tool provides the possibility to remove the pressing device from the carriage by screwing it off so that the carriage can then be lifted off the guide rail, the carriage of the known machine tool constitutes the whole worktable which means that if the sliding pads should get worn, the whole worktable must be disassembled and repaired. And the reassembly of the arrangement also has to be carried out with extreme care as the roller bearings may easily be damaged at the lateral guiding planes of the guide rails during mounting of the very heavy worktable, which is designed in this case as carriage. This risk is even increased by the fact that the arrangement uses two mirror-symmetrical parallel guide rails extending in parallel at a certain distance from each other. Due to this configuration, the worktable must be lowered upon the two guide rails with extreme precision in order to permit the rolling elements of the two roller bearings to slide down along the vertical guiding surfaces of the guide rails, in straight alignment and without being damaged, until the worktable, with the plastic sliding pads mounted thereon, comes to rest upon the guide rails.

The leaflet "GT" by Gleitbelagtechnik GmbH SKC 3, 1982, page 8, describes an arrangement where the guiding surfaces of a machine tool are formed by a guide rail which exhibits a substantially rectangular cross-section with a lateral projection arranged on one side of its upper half. A guiding element running on the guide rail engages the guide rail by its horizontal upper face, over one full vertical side and—on the opposite side in the area of the projection—by the latter's shorter vertical side. The guiding surfaces are formed by plastic sliding pads so that one obtains a metal/plastic surface combination. According to the leaflet, the sliding pads are either applied with a spatula or produced by molding. Further, it has been known from the leaflet that such guides can be used also for machine tools. The guide element of the described arrangement is formed integrally with the moving unit which means that when repairs or maintenance work become necessary, the whole element to be guided has to be dismantled and the sliding pad has to be removed from the very large guiding element.

In the case of machining centers, i.e. numerically controlled machine tools, where a plurality of successive machining operations, in particular milling and drilling operations, are carried out on a workpiece, linear guides comprising guide rails and carriages are used, for example, for displacing a headstock along two horizontal axes extending perpendicularly to each other, and one vertical axis. Conventional machining centers use shoes arranged on the carriages, which are guided via a ball bearing guide along guide rails of matching prismatic design. This arrangement leads to a metal/metal surface combination in the guiding area.

Although the metal/metal surface combination certainly offers certain advantages, as regards the precision of the guide and, thus, the dimensional accuracy of the machined workpieces, disadvantages may result from the metal/metal combination when the machine tool is exposed to vibrations. Such vibrations may occur, for example, during milling when large chips are removed by the milling process. The metal/metal surface combination may then prove to be a disadvantage as the resulting connection between the two machine parts, for example the headstock and the machine bed, is extremely hard, and this condition may give rise to undesirable vibrations in the machining center.

On the other hand, such machining operations frequently give rise to the problem that in the presence of such high chip removal rates the spindle stock is also subjected to considerable forces, i.e. reaction forces.

Such reaction forces may act in any direction, including the upward direction.

Now, it is the object of the present invention to improve a machine tool of the type described above in such a way that the guiding means by which the machine elements are guided along each other provide a certain self-damping effect, especially in the case of machining centers intended for performing milling operations with high chip removal rates, and that in addition the machine elements engage each other in form-locking relationship in as many coordinate directions as possible, while the guide elements of the machine elements can be repaired with the least possible input, without the necessity to handle the entire guided machine element to a larger extent.

The invention achieves this object due to the fact that the shoe is split along a horizontal plane and has its upper part guided by the upper face of the projection, and its lower part guided by the lower face of the projection.

This solves the object underlying the present invention fully and perfectly. On the one hand, the invention makes use of the fact that machine tool guides equipped with plastic sliding pads offer a natural self-damping effect so that the transmission from one machine element to the other of greater vibrations produced by machining operations with high chip removal rates is either fully eliminated or at least damped. In addition, the invention makes use of a guiding arrangement, where the shoe engages the guide rail from below so that the machine elements can be guided in form-locking relationship in all coordinate directions perpendicular to the longitudinal direction of the guide rail. This is true in particular for horizontal guide rails when a vertical, upwardly directed force such as a reaction force of the tool is exerted upon the guided machine element. Given the fact that the shoe is fastened on the second machine element by detachable connection means, the guide elements can be easily exchanged if they should be damaged or worn. It is then only necessary to release the described connection means, i.e. to untighten the screw, in order to remove the shoe from the second machine element and to mount another new shoe whereby the downtimes of the machine tool can be minimized. This distinguishes the machine tool according to the invention from the prior art described at the outset ("GT" leaflet) as in this latter case the lining is applied directly on the guiding element, over the latter's full surface, with the result that the whole guiding part must be handled and worked when the linings are worn. This leads to considerable downtimes of the machine which is equipped with such guides.

According to a preferred improved embodiment of the machine tool according to the invention, a plurality of shoes are arranged one behind the other on the machine element. In particular, two parallel guide rails are arranged on the first machine element for guiding shoes, for example two groups of two or two groups of three shoes, arranged on the second machine element.

This feature provides the advantage that the size of the guide elements is reduced to the relatively small shoes which leads on the one hand to space savings and prevents on the other hand any tilting, the guiding contact being established practically by twice two or twice three points.

According to a preferred embodiment of the invention, the sliding pads are retained in the one machine element in form-locking relationship, in a manner known as such.

This feature provides the advantage that the sliding pads are secured against displacement on the machine part on which they are mounted.

According to another particularly preferred embodiment of the invention, the sliding pads are formed, in a likewise conventional manner, by injection against a mold formed in recesses provided in the one machine element, through injection bores arranged in the one machine element. The sliding pads end in this case in a sprue extending into the injection bores which are designed as threaded bores.

This feature provides the advantage that the sliding pads are also reliably secured in their recesses due to the fact that the sprues sort of dig themselves into the threaded bores thus providing a safe mechanical support for the sliding pads.

According to another preferred embodiment of the invention, the recesses are provided with a non-level, in particular a toothed surface.

This feature also provides the advantage that the sliding pads are prevented from getting dislodged, in particular in the longitudinal direction of the guide rail.

According to other preferred embodiments of the invention, lubricating grooves are provided in the sliding pads.

This feature provides the advantage to enable lubricants to be transported into the area of the plastic/metal surface combination so that the frictional forces encountered can be minimized.

Another particularly preferred embodiment of the invention is further characterized by the fact that passage bores intended for fastening the shoes to the other machine part are arranged on longitudinal sides of the shoe in alignment with the mounting bores intended for screwing the upper part to the lower part, the said bores ending in recesses which have been worked into the lower part from one side and which are separated by web portions of the lower part.

This feature provides the advantage that the shoe can be assembled, i.e. the upper and the lower parts can be mounted on the guide rail, in a simple manner, the laterally widening recesses allowing a bent tool, for example a hexagon spanner, to be applied for tightening both the screws serving to fix the two parts together, and the screws by which the shoe is fixed to the other machine part, for example the headstock carriage. By providing separate recesses which are separated by web portions of the material of the lower part one achieves the considerable advantage that the mechanical stability of the shoe is clearly increased as compared to an arrangement comprising a recess extending over the whole length of the side, across all bores. An additional advantage of the web portions lies in the fact that they can be utilized for accommodating lubricant channels leading to the lubricating grooves.

According to another preferred embodiment of the invention it is further provided that the sliding pads are arranged on the shoe and that the axial end faces of the shoe are equipped with covering frames providing an axial cover for at least those sections of the sliding pad which project beyond the shoe surfaces.

This feature provides the advantage that the entire cross-section embraced by the shoe, except for the cross-section of the guiding rail, is covered reliably which ensures on the one hand that the sliding pad is held in the longitudinal direction of the guiding rail, while on the other hand no dirt is permitted to enter the area of the guiding rails.

Finally, it is provided according to another particularly preferred embodiment of the invention that the junction plane extends above the contact surface of the sliding pad of the bottom element which is in contact with the lower face of the projection.

This feature provides the advantage that the planes of the junction plane on the one hand and the supporting surface on the other hand are spaced relative to each other so that the bottom part, for example, may be worn down in the area of its junction plane, as mentioned before, without the contact surface of the sliding pad being damaged itself.

Other advantages of the invention will appear from the following description and the attached drawing.

It is understood that the features that have been mentioned before and will be described hereafter may be used not only in the described combination, but also in any other combination or individually, without leaving the scope of the present invention.

Certain embodiments of the invention will now be described in more detail with reference to the drawing in which FIG. 1 shows a top view of a linear guiding arrangement of a machine tool according to the invention;

FIG. 4 shows another cross-section along line IV—IV in FIG. 5, likewise in enlarged scale;

FIG. 5 shows another cross-section along line V—V in FIG. 4, likewise in enlarged scale; and FIG. 6 shows a detail of the representation of FIG. 5, in greatly enlarged scale.

Figure 1:
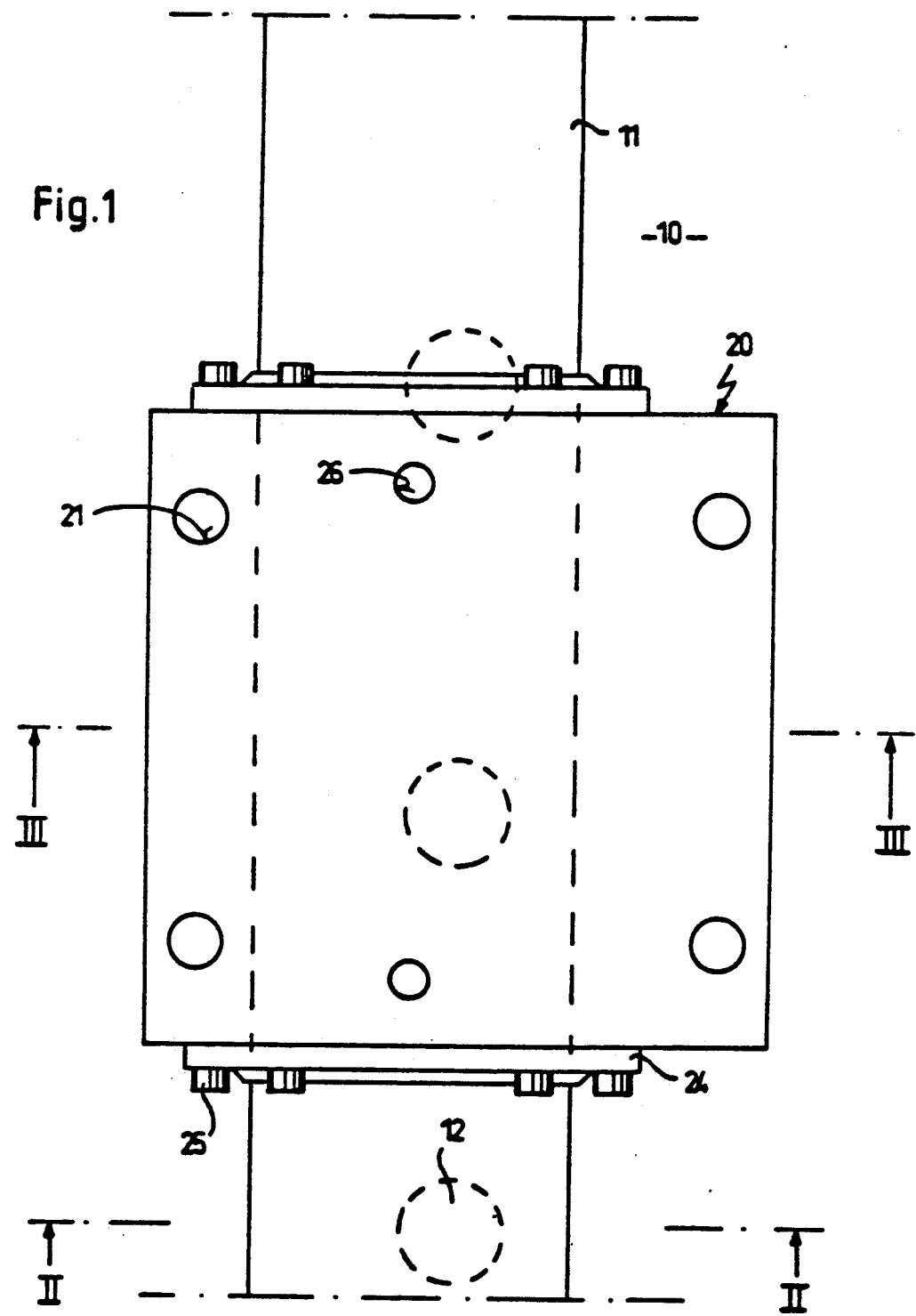
Figure 2:
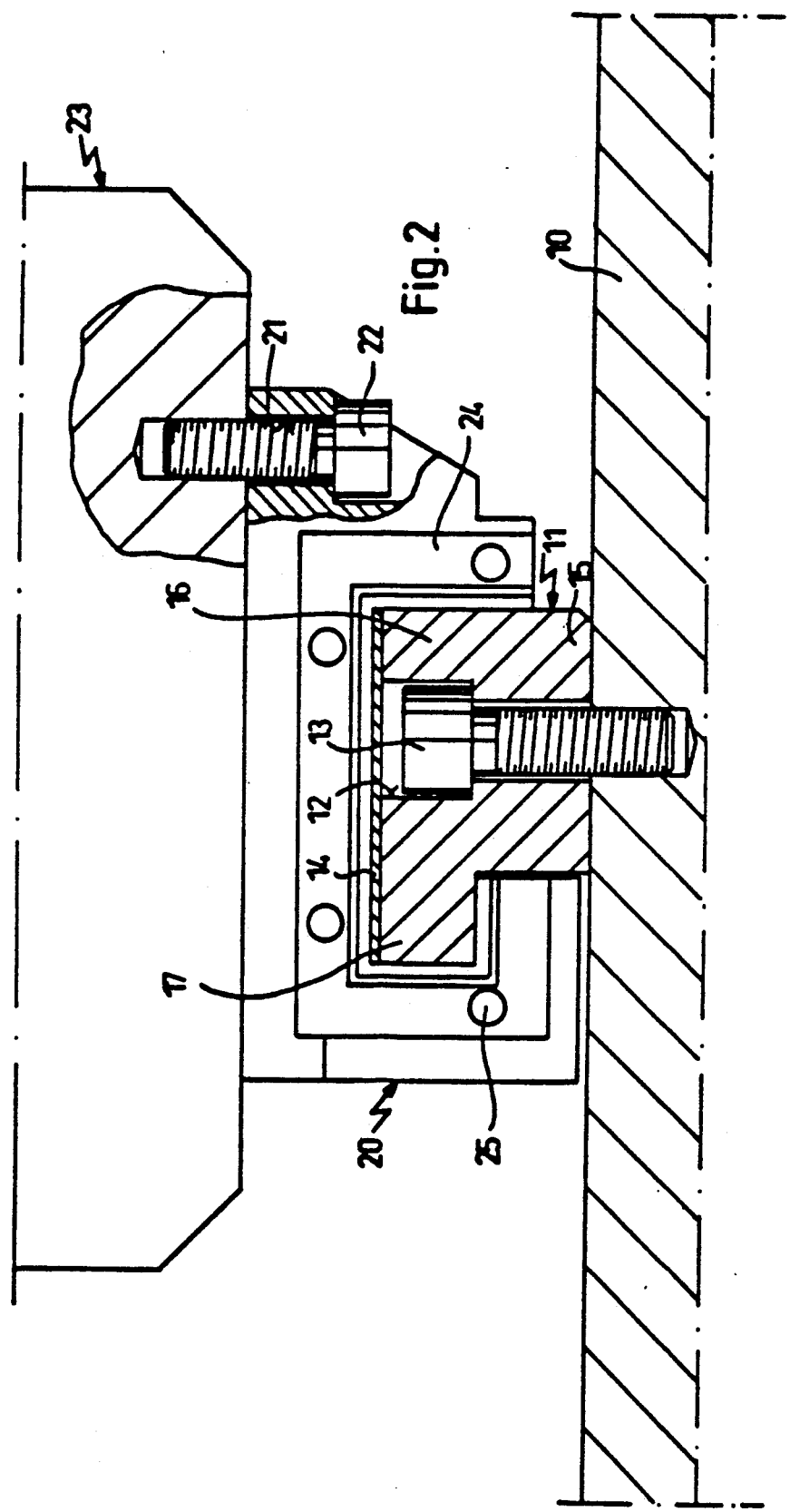
FIG. 2 shows a cross-sectional view of the arrangement of FIG. 1, along line II—II.

Regarding FIGS. 1 and 2, reference numeral 10 indicates a bed of a machine tool, for example of a machining center intended for carrying out numerically controlled milling and drilling operations on work pieces.

A horizontal surface of the bed 10 carries a guide rail 11. The guide rail 11 is equipped for this purpose with axially spaced stepped passage bores 12 through which screws 13 are passed for screwing the guide rail 11 to the bed 10. A cover plate 14 is mounted on top of the guide rail and the stepped passage bores 12.

Regarded in a direction perpendicular to the longitudinal direction of the guide rail 11, the latter comprises a narrower lower portion 15 and a wider upper portion 16 so that the upper portion 16 has one side, in FIG. 2 the left side, project beyond the lower portion 15 in the form of a projection 17.

The guide rail 11 carries a sliding shoe 20. The sliding shoe 20 is provided with passage bores 21 arranged along longitudinal sides of the sliding shoe 20. The bores 21 receive screws 22 intended to screw the sliding shoe 20 by its upper face to a moving machine part, for example a carriage 23 of a headstock of a machine tool.

Preferably, the machine bed 10 is equipped with two parallel guide rails 11, and each guide rail 11 carries two or three sliding shoes 20 which are arranged one behind the other and which are screwed to the carriage 23. The carriage 23 is guided in this manner on the guide rails 11 and, thus, on the machine bed 10 by a twice two or a twice three guiding arrangement.

The axial end faces of the sliding shoe 20 are equipped with covering frames 24 which are screwed to the shoe by means of screws 25. The covering frames 24 comprise a window the cross-section of which is just equal to the radial cross-section of the guide rail 11 so that the covering frames 24 move closely along the surfaces of the guide rail 11 during displacement of the sliding shoe 20.

Figure 3:
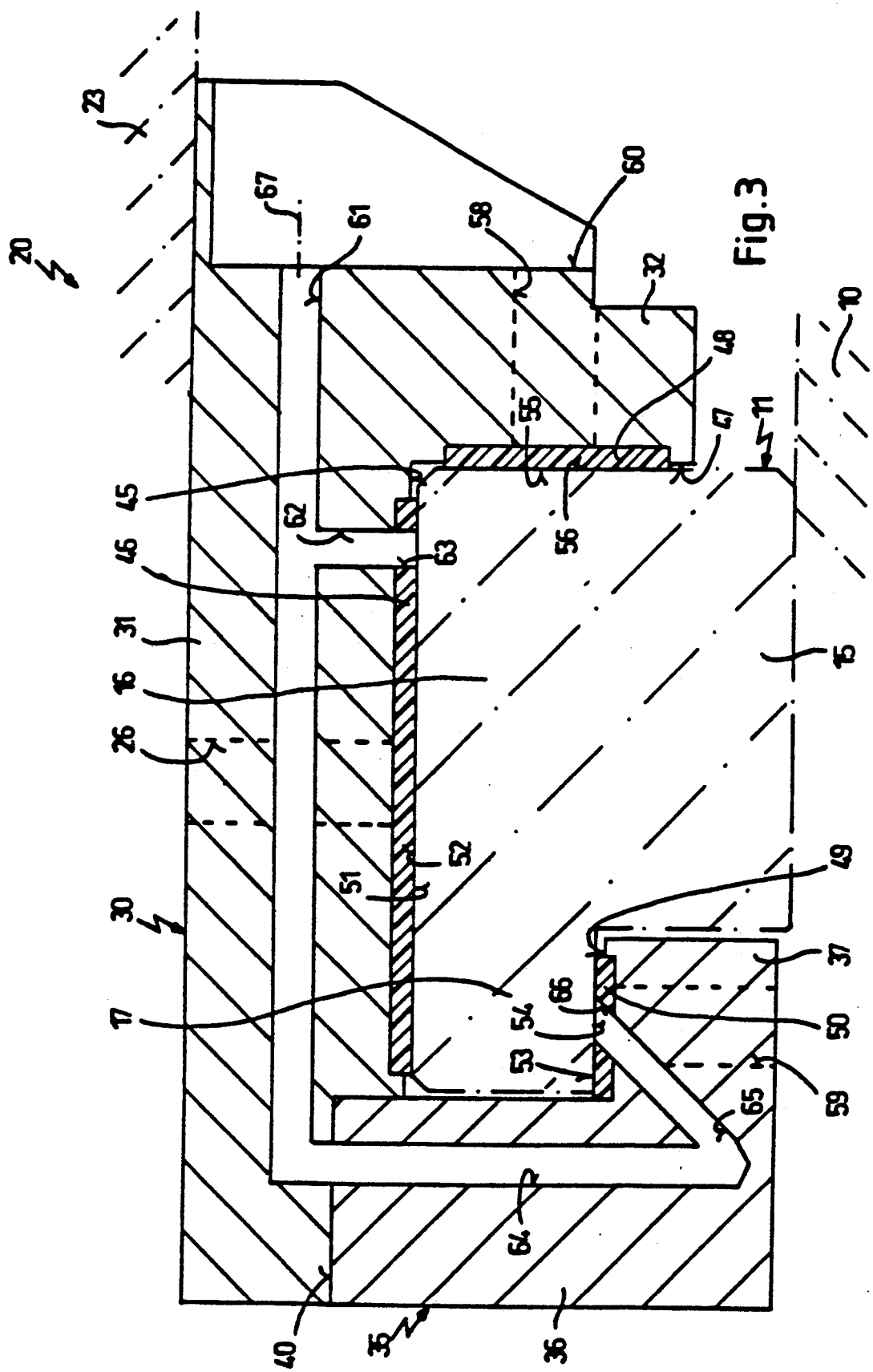
FIG. 3 shows another cross-section along line III—III in FIG. 1, in enlarged scale.

FIG. 3 shows, for example, that the sliding shoe 20 comprises an upper part 30 consisting of an upper horizontal portion 31 and a right vertical portion 32. The upper part 30 is followed, in downward direction, by a bottom part 35 consisting of a left vertical portion 36 and a lower horizontal portion 37. The upper part 30 is separated from the lower part 35 along a horizontal junction plane 40.

A lower surface 45 of the upper horizontal portion 31 is provided with a first sliding pad 46 of a plastic material which is laterally held, in form-locking engagement, in a corresponding recess in the lower surface 45. The left surface 47 of the right vertical portion 32 is provided with a second sliding pad 48 of similar design.

Finally, an upper surface 49 of the lower horizontal portion 37 is equipped with a third sliding pad 50, likewise of similar design.

As appears very clearly from FIG. 3, the sliding shoe 20 is guided in this manner on the guiding rail 11 in form-locking engagement, by a plastic/metal surface combination 51, 52 at the upper face of the wide upper portion 16 of the guide rail 11, a surface combination 53, 54 at the lower face of the projection 17 and a surface combination 55, 56 at the continuous right vertical side of the guide rail 11.

Consequently, the guiding shoe 20 is guided on the guiding rail 11 in such a way that the guiding shoe can be neither lifted off the guiding rail 11 towards the top, nor tilted about an axis parallel to the guide rail 11.

Further, it can be clearly seen in FIG. 3 that the junction plane 40 is located far above the contact surface 53 of the sliding pad 50 by which the horizontal portion 37 of the bottom part 25 bears against the lower face 54 of the projection 17.

The upper part 30 of the sliding shoe 20 being detachably connected to the bottom part 35, the lower flange-like portion of the sliding shoe 20 in the form of the lower horizontal portion 37 can be assembled easily, for example when the carriage 23 has been positioned on the guide rail 11 with the upper part 30 of the sliding shoe 20 screwed to its bottom face. The carriage 23 can then be fixed and secured in form-locking engagement by simply screwing the bottom part 35 to the upper part 30 from below.

In the event the horizontal sliding pads 46 and 50 should get worn, it is further possible to remove the bottom part 35 from the upper part 30 by untightening the screws, and to grind off the surface of the bottom part 35, which forms the horizontal junction plane 40, by a small amount, for example by 3/100 mm. When the bottom part 35 is then screwed again to the upper part 30, the sliding shoe 20 will again be retained on the guide rail 11 in form-locking engagement and free from play.

In order to enable the sliding pads 46, 48, 50 to be placed in position on their respective supporting surfaces, there are provided injection bores 26, 58, 59 extending through the upper part 30 or the bottom part 35, perpendicularly to the planes defined by the sliding pads 46, 48, 50. It is thus possible to form the sliding pads 46, 48, 50 at the respective surfaces of the sliding shoe 20 in the manner which will be described in more detail further below, with reference to FIG. 5.

It can be further seen in FIG. 3 that the right side of the upper part 30 comprises a recess 60 extending over its full axial length. The axial recess 60 is stepped in height in such a way that the recess 20 is wider at the upper and lower ends of the sliding shoe 20—as viewed in FIG. 1—to form the passage bores 21 for the screws 22. In contrast, the recess 60 is higher in the area illustrated in FIG. 3 so that a horizontal lubricant channel 61 can be worked into the part from the side. A side channel 62 branching off from the lubricant channel 61 in downward direction ends in a bore 63 in the surface 51 of the first sliding pad 56. The lubricant channel 61 extends over almost the entire width of the upper part 30 and is then followed by a downwardly direction portion 64 which terminates, shortly before it reaches the lower face of the bottom part 35, in an upwardly directed portion 65. The portion 65 finally ends in a bore 66 in the surface 53 of the third sliding pad 50.

Reference numeral 67 indicates a lubricant connection provided at the end of the lubricant channel 61 through which the entire channel system can be supplied, the single connection being in addition protected mechanically by the recess 60.

FIG. 4 shows a horizontal cross-section through the bottom part 35. The illustration shows clearly that—as has been mentioned before—the third sliding pad 50 is arranged in a recess in the lower horizontal portion 37, i.e. in sort of a trough 70, 71. Further, it can be seen that the lubricating groove portions 75, 76, 77, 78 branching off from the bore 66 of the lubricant channel extend by sections in axial (75, 77) and radial (76, 78) direction thus forming a meanderlike arrangement.

The left lateral face of the bottom part 35 is provided with four spaced recesses 80 to 83 which are separated by webs 84 consisting of the material of the bottom part.

The recesses 80 to 83, just as the continuous recess 60 provided at the opposite side of the sliding shoe 20, serve the purpose to enable screws to be introduced and tightened from the bottom and/or from the side. In FIG. 4, for example, the uppermost and the lowermost recesses 80, 83 are intended to receive the mounting screws 22, as indicated by a dash-dotted bore 21 in the uppermost recess 80. The two central recesses 81, 82 in contrast are intended to receive connection screws for screwing together the upper part 30 and the bottom part 35. The bottom part 30 is provided for this purpose with a passage bore 85 above each of the recesses 81, 82.

FIG. 5 illustrates by way of the third sliding pad 50 how the latter is introduced into the groove 70, 71 (FIG. 4).

For the purpose of placing the pad into the groove, a mold 87 is positioned on the upper surface 49 of the lower horizontal portion 37. The lower face of the mold 87 has a shape complementary to the desired shape of the third sliding pad 50. Once the mold 87 has been positioned and fixed in place, a plastic material is injected through the third injection bore 59.

The plastic material consists preferably of an epoxy resin containing suitable fillers. The injection bores having the form of threaded bores, it is on the one hand easily possible to connect an injection tool to the injection bores 59, by means of screws. On the other hand, the design as threaded bores provides the additional advantage that the sprue sections forming in the injection bores, for example the sprue 88 illustrated in FIG. 5, dig themselves into the thread so that they constitute additional mechanical retention means for the sliding pads 46, 48, 50.

In order to improve the adhesion of the sliding pads 46, 48, 50 to the corresponding surfaces 45, 47, 49 still further, the latter may be provided with a toothed or generally irregular surface 90, as illustrated in FIG. 6.

We claim:

1. A machine tool having displacement units being linearly guidable along each other, the machine tool comprising:

a first displacement unit having an elongate metallic guiding rail mounted thereon and extending along a guide axis, said guiding rail having a lower portion adjacent said first displacement unit and an upper portion distant from said first displacement unit, said upper portion having an upper protrusion extending laterally beyond said lower portion, thus forming an upper rail surface facing away from said first displacement unit and a lower rail surface on said upper protrusion facing toward said first displacement unit, a second displacement unit being guided on said first displacement unit along said guide axis, metallic shoe means releasably attached to said second displacement unit, said shoe means being subdivided along a plane parallel to said guide axis, thus forming an upper section and a lower section, with said sections being releasably attached to each other, said upper section having a lower shoe surface and said lower section having a lower lateral protrusion with an upper shoe surface, said shoe means being slidably arranged on said guiding rail with said lower protrusion arranged between said upper protrusion and said first displacement unit, said upper rail surface facing said lower shoe surface and said lower rail surface facing said upper shoe surface, and plastic material sliding pads arranged between said upper rail surface and said lower shoe surface as well as between said lower rail surface and said upper shoe surface, said sliding pads being formed by injection against a mold formed in recesses provided in said first displacement unit, through injection bores arranged in said first displacement unit, said sliding pads ending in a sprue extending into a threaded section of said injection bores.

2. The machine tool of claim 1, wherein said first displacement unit is a machine bed and said second displacement unit is a headstock.

3. The machine tool of claim 1, wherein a plurality of shoes are arranged one behind the other along said guide axis and attached to said second displacement unit.

4. The machine tool of claim 1, wherein two parallel guide rails are mounted on said first displacement unit, each of said parallel guide rails guiding shoes attached to said second displacement unit.

5. The machine tool of claim 1, wherein said sliding pads are retained in said first displacement unit in form-locking relationship.

6. The machine tool of claim 1, wherein said plane extends above a contact surface of said lower section sliding pad being in contact with said lower rail surface.

7. The machine tool of claim 1, wherein said recesses are provided with a toothed surface.

8. The machine tool of claim 1, wherein lubricating grooves are provided in said sliding pads.

9. The machine tool of claim 1, wherein passage bores for bolting said shoes to said second displacement unit are arranged on longitudinal sides of said shoe in alignment with mounting bores for bolting said upper section to said lower section, said bores ending in recesses arranged in said lower section and being separated from each other by web portion of said lower section.

10. The machine tool of claim 1, wherein said sliding pads are arranged on said shoe, axial end faces of said shoe being equipped with covering frames providing an axial cover for sections of said sliding pads projecting beyond said shoe axial end surfaces. . .

* * * * *